United States Patent [19]

Savoca

[11] Patent Number: 5,048,774
[45] Date of Patent: Sep. 17, 1991

[54] HIGH-ACCURACY ATTITUDE SENSOR FOR SPIN STABILIZED SATELLITE

[75] Inventor: Robert C. Savoca, Ridgefield, Conn.
[73] Assignee: Barnes Engineering Co., Shelton, Conn.
[21] Appl. No.: 453,707
[22] Filed: Dec. 20, 1989
[51] Int. Cl.$^5$ .................................................. B64G 1/36
[52] U.S. Cl. .................................... 244/171; 356/152; 250/206.1
[58] Field of Search ............................... 244/171, 164; 250/206.1, 206.2, 203.1; 356/152, 141

[56] References Cited

U.S. PATENT DOCUMENTS

| | | | |
|---|---|---|---|
| 3,090,583 | 5/1963 | Behan et al. | 244/171 |
| 3,576,999 | 5/1971 | Blythe et al. | 244/171 |
| 3,827,807 | 8/1974 | Fletcher et al. | 250/206.2 |
| 4,792,684 | 12/1988 | Saroca | 356/152 |
| 4,883,244 | 11/1989 | Challoner et al. | 244/171 |

OTHER PUBLICATIONS

"SHCI Sensor"–ITHACO Space Products 1979, ITHACO, Inc., 735 West Clinton St., Box 818, Ithaca, NY 14850.

Primary Examiner—Joseph F. Peters, Jr.
Assistant Examiner—Christopher P. Ellis
Attorney, Agent, or Firm—Parmelee, Bollinger & Bramblett

[57] ABSTRACT

A conical scanner having a detector is mounted on a spinning satellite with the scanner axis directed normal to the satellite spin axis for scanning the detector over a great circle passing through the poles of the spin axis of the satellite and producing horizon crossing information of the bodies in the scanning path of the scanner. The scan rate of the conical scanner is synchroized with the spin rate of the satellite and then by slightly increasing or decreasing the scan rate of the conical scanner, successive crossings are precessed through the field of view of the detector for determining the orientation of the satellite with respect to the earth or other celestial body such as the sun or the moon with great accuracy. When the satellite is operated at high spin rates, the conical scanner is operated at a slower rotational speed allowing gaps between successive scans which are filled by precessing the conical scanner to fill in the gaps after several satellite rotations.

5 Claims, 2 Drawing Sheets

HIGH-ACCURACY ATTITUDE SENSOR FOR SPIN STABILIZED SATELLITE

BACKGROUND OF THE INVENTION

This invention relates to methods for obtaining a high-accuracy attitude sensor for a spin stabilized satellite.

Some satellites are attitude stabilized by causing such satellites to spin around a predetermined axis. Such satellite usually employ optical or infrared sensors to determine the orientation of the satellite's spin axis with respect to celestial objects such as the earth, moon and sun. One frequently used is an infrared horizon crossing indicator (HCI) which views a narrow field directed outward from the spacecraft at some angle with the spin axis of the spacecraft. The horizon crossing indicator scans a circle in space around the spin axis by the rotation of the satellite on its spin axis and produces pulse signals in the field of the infrared detector of the HCI crosses the earth's horizon. The phase and interval between crossings provides the attitude information.

The direction of the sun or moon can also be found with such sensors, but the angular subtense of such celestial objects will generally be so small that in using a fixed angle the scan circle may not intersect such objects. This problem can be overcome by incrementing the angle with respect to the spin axis by the diameter of the field of view of the HCI after each rotation. However, this greatly increases the acquisition time and, in addition, the HCI could lose the object during rapid maneuvers.

SUMMARY OF THE INVENTION

It is an object of the present invention to provide a new and improved method of obtaining a high-accuracy attitude sensor for a spin stabilized satellite.

Another object of the present invention is to provide a method for providing attitude information with respect to a spin stabilized satellite which has the ability to rapidly acquire the object under observation and then to provide two axis information with great accuracy.

Still another object of this invention is to provide a new and improved method for obtaining a high-accuracy attitude sensor for a spin stabilized satellite which provides improved accuracy in determining the orientation of the moon or the sun with respect to the spinning satellite.

In carrying out this invention in one illustrative embodiment thereof, a high-accuracy method of determining the attitude of a spin stabilized satellite with respect to the earth and other celestial objects such as the sun and the moon is comprised of the steps of mounting a conical scanner having a detector on a spinning satellite with the scanner axis directed normal to the satellite spin axis for scanning the detector over a great circle passing through the poles of the spin axis of the satellite and providing crossing information of the bodies in the scanning path of the conical sensor. The scan rate of the conical sensor is synchronized with the spin rate of the satellite and then the scan rate of the conical scanner is slightly increased or decreased for precessing successive crossing through the field of view of the detector for determining the orientation of the satellite with respect to the earth or other celestial body.

BRIEF DESCRIPTION OF THE DRAWINGS

The invention together with further objects, aspects, features and advantages thereof will be more clearly understood from the following description taken in connection with the accompanying drawings.

DESCRIPTION OF THE PREFERRED EMBODIMENTS

Figure 1:
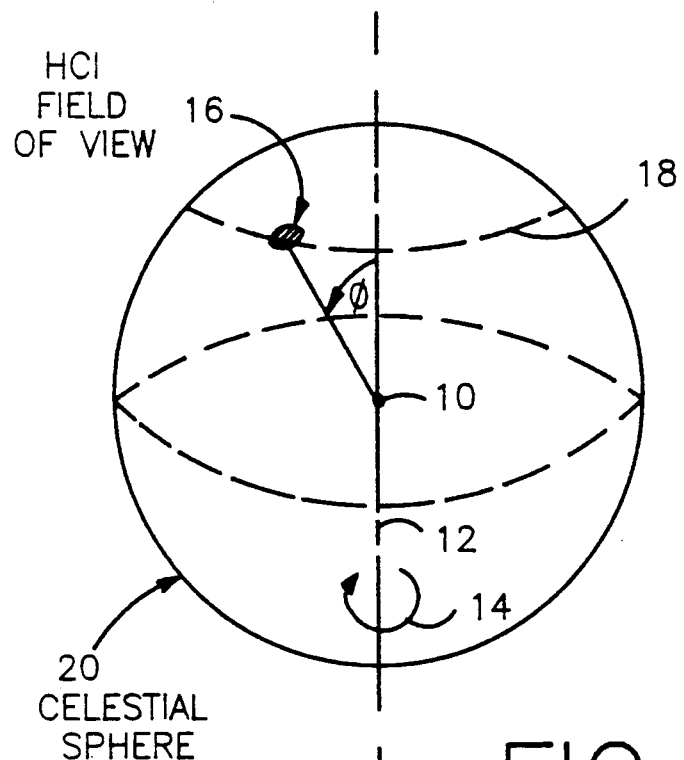
FIG. 1 is a diagram illustrating the scan pattern of one type of infrared horizon crossing indicator (HCI) which scans a circle in space around the spin axis of the satellite.

An infrared horizon crossing indicator (HCI) is illustrated diagramatically as a point 10 on a spin stabilized satellite (not shown) having a satellite spin axis 12 rotating in the direction of the arrow 14. The horizon crossing indicator 10 views a narrow field 16 directed outward from the spacecraft (not shown) at an angle $\phi$ with the spin axis 12. Accordingly, the rotation of the spacecraft around the spin axis 14 scans the HCI 10 with a field of view 16 in a circle 18 in space around the spin axis 12 as illustrated in FIG. 1. The HCI 10 produces pulse signals when its field of view 16 crosses the earth 20 horizon and the spacing and intervals between the crossings provide the attitude information of the spacecraft with respect to its orientation to the earth.

The direction of the sun or moon can also be found with such a sensor 10, but the angular subtense of such celestial bodies will generally be so small that with the fixed angle $\phi$ the scan circle 18 may not intersect the sun or moon therefor failing to locate them. This problem can be overcome by incrementing the angle $\phi$ by diameter of the field of view of the HCI 10 after each rotation. However, this greatly increases the acquisition time and, in addition, the HCI 10 could loose the object during rapid maneuvers. For example, a typical spin rate for the satellite on which the horizon crossing indicator is mounted is 2 RPM and a typical HCI field is 2.5°. Accordingly, it will take 180° divided by 2.5°=72 rotations or 36 minutes increment the HCI 10 to cover the entire celestial sphere 20.

Figure 2:
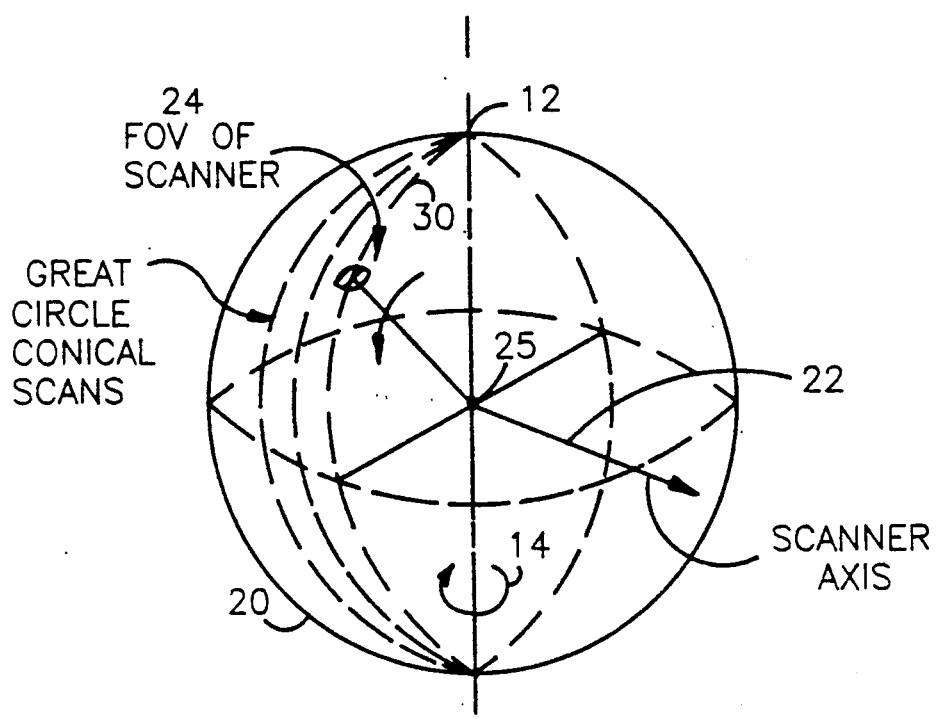
FIG. 2 is a diagram illustrating the use of a conical scanner having a scan axis directed normal to the satellite spin axis for scanning great circles passing through the poles of the spin axis of the satellite in accordance with the present invention.

This acquisition time can be greatly reduced by using a conical scanner having a 90° half cone angle illustrated diagramatically by the point 25 on FIG. 2 and a scanning axis 22 directed normal to the satellite's spin axis 12. The scanner will then scan a great circle 30 by the field of view 24 of the scanner 25 which passes through the poles of the spin axis 12 as shown in FIG. 2. The great circle 30 will rotate with the satellite and the entire celestial sphere or earth 20 will be covered in one half rotation or 15 seconds. In order for the field of view 24 of the scanner 25 to advance 2.5° on each scan, the rotational rate of the scanner 25 must be 360° divided by 2.5°=144 times faster than the rotational rate of the satellite on which the scanner 25 is mounted or 288 RPM (4.8 RPS). Although the invention is directed to a method of providing attitude information for a spin stabilized satellite, one form of conical horizon sensor which may be utilized is shown and described in U.S. Pat. No. 3,020,407 which is assigned to the assignee of the present invention.

Figure 3:
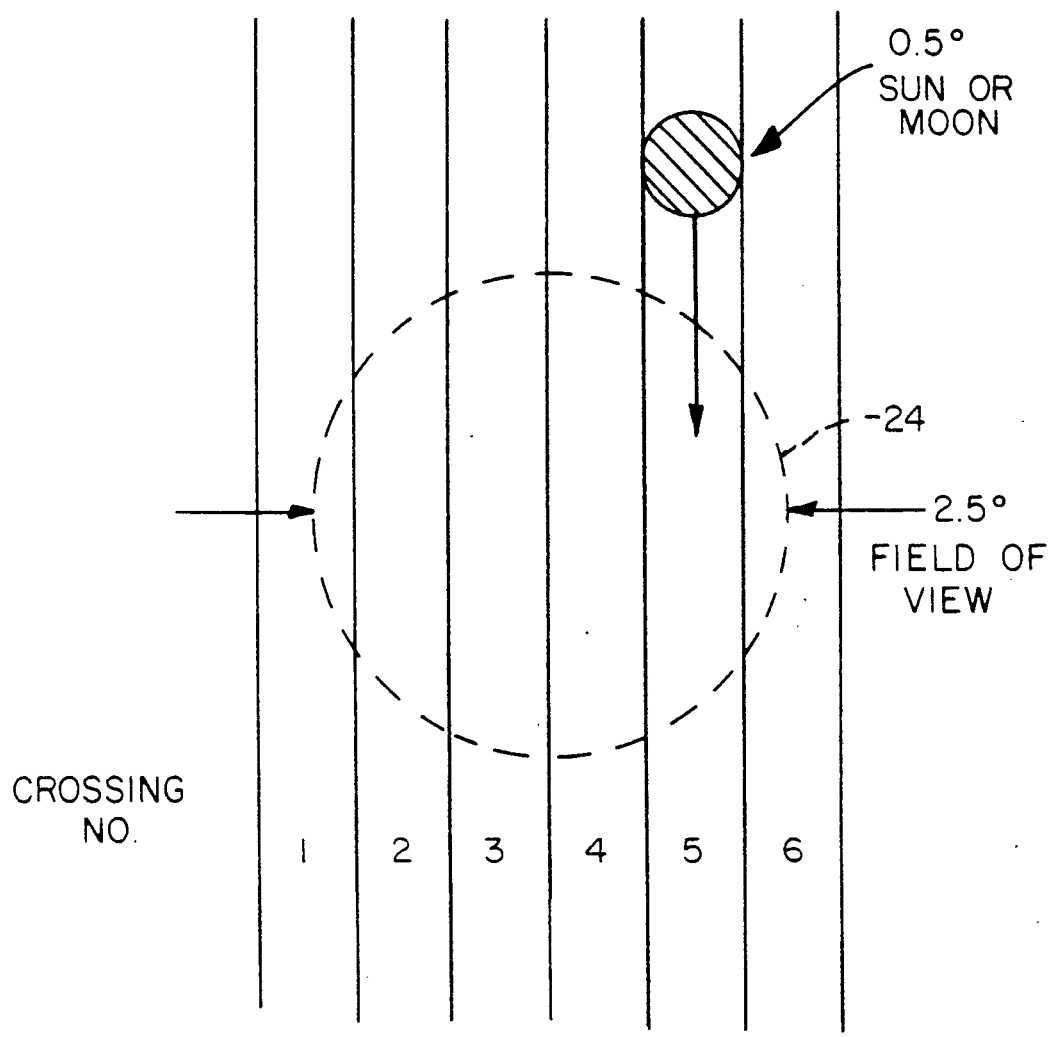
FIG. 3 illustrates the precessing of successive horizon crossings in accordance with the present invention in which such pattern of crossings will greatly improve the accuracy in determining the orientation of other celestial objects such as the sun or the moon.

If the scan rate of the conical scanner 25 is synchronized with the spin rate 14 of the satellite on which the scanner is mounted, successive crossings will occur at the same point within the field of view 24. The sun and the moon each subtend 0.5° and one crossing through a 2.5° field will not give sufficient accuracy for most applications. However, if the scan rate of the scanner 25 is slightly increased or decreased, successive crossings will precess through the field as shown in FIG. 3. The pattern of crossings as illustrated will greatly improve accuracy in determining the orientation of the sun or moon.

The satellite's spin rate can be measured to a high degree of accuracy by averaging the time between many crossings of the earth, sun or moon. The scan speed of the scanner 25 can then be set to give the desired field precession. To obtain a 0.5° displacement of each crossing, the scan speed of the scanner must be set to be 0.5° divided by 180°=0.277% faster or slower than the synchronous speed.

With high satellite spin rates, the rotational speed of the scanner required to search with successive scans tangent may become impractically high. In such a case, a slower scan rate can be used with gaps allowed between successive scans. Then by causing the scan to precess as described previously, the gap can be filled in after several satellite rotations. In the previous example, if the satellite spin rate were 6 RPM, instead of 2 RPM, successive scans would be 7.5° apart at the equator leaving 5° gaps. By precessing 5° per revolutions, these gaps would be covered after 1.5 revolutions of the satellite. Accordingly, the acquisition and accuracy of the HCI in accordance with the present invention are greatly enhanced with high accuracy.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A high accuracy method of determining the attitude of a spin stabilized satellite with respect to the earth or other celestial bodies such as the sun and moon comprising the steps of:

mounting a conical scanner having a detector on a spinning satellite with the scanner axis directed normal to the satellite spin axis for scanning the detector over a circle producing crossing information of the bodies in the scanning path of the conical scanner;

synchronizing the scan rate of the conical scanner with the spin rate of the satellite; and slightly increasing or decreasing the scan rate of the conical scanner for precessing successive crossings through the field of view of the detector for determining the orientation of the satellite with respect to the earth and other celestial bodies.

2. The method as claimed in claim 1 including the step of providing the conical scanner with a 90 decree half cone angle.

3. The method as claimed in claim 1 including the steps of measuring the satellite spin rate by averaging the time between a plurality of crossings of the earth or other celestial body and setting the scan speed of the conical scanner to provide the desired field precession.

4. The method as claimed in claim 3 including the step of obtaining a 0.5 degree displacement of each crossing by setting the scan speed of the conical scanner to 0.277% faster or slower than the synchronous speed.

5. A high accuracy method of determining the attitude of a spin stabilized satellite with respect to the earth or other celestial body such as the sun and moon comprising the steps of:

mounting a conical scanner having a detector on a spinning satellite with the scanner axis directed normal to the satellite spin axis for scanning the detector over a great circle passing through the poles of the spin axis of the satellite and producing crossing information of the bodies in the scanning path of the conical scanner;

operating the conical scanner at a slower rotational speed than the satellite spin rate when the satellite is operated at high satellite spin rates thereby allowing gaps between successive scans;

causing the scans of the conical scanner to precess by slightly increasing or decreasing the scan rate of the conical scanner thereby filling in the gaps after several satellite rotations.

* * * * *